United States Patent
Woodard et al.

(10) Patent No.: US 9,878,773 B2
(45) Date of Patent: Jan. 30, 2018

(54) SPLIT RESISTANT COMPOSITE LAMINATE

(71) Applicant: The Boeing Company, Chicago, IL (US)

(72) Inventors: Patrick Woodard, Renton, WA (US); Max Kismarton, Renton, WA (US); Francis E. Andrews, Everett, WA (US)

(73) Assignee: The Boeing Company, Chicago, IL (US)

( * ) Notice: Subject to any disclaimer, the term of this patent is extended or adjusted under 35 U.S.C. 154(b) by 194 days.

(21) Appl. No.: 13/692,424

(22) Filed: Dec. 3, 2012

(65) Prior Publication Data

US 2014/0151507 A1    Jun. 5, 2014

(51) Int. Cl.
| | | |
|---|---|---|
| *B64C 3/26* | (2006.01) | |
| *B64C 1/00* | (2006.01) | |
| *B32B 5/12* | (2006.01) | |

(52) U.S. Cl.
CPC ............... *B64C 3/26* (2013.01); *B32B 5/12* (2013.01); *B64C 2001/0072* (2013.01); *Y02T 50/433* (2013.01); *Y10T 428/24124* (2015.01)

(58) Field of Classification Search
CPC ..... B32B 5/12; B64C 2001/0072; B64C 1/00; B64C 3/26; Y02T 50/433
USPC ........................ 428/297.4; 244/133; 264/257
See application file for complete search history.

(56) References Cited

U.S. PATENT DOCUMENTS

| | | |
|---|---|---|
| 2,108,041 A | 2/1938 | Colvin et al. |
| 2,498,976 A | 2/1950 | Wittman |
| 2,534,722 A | 12/1950 | Meiklejohn, Jr. et al. |
| 2,611,564 A | 9/1952 | Geisse |
| 3,238,690 A | 3/1966 | Wilkins |
| 3,266,130 A | 8/1966 | Glaze |
| 3,381,484 A | 5/1968 | Laughlin |
| 3,490,983 A | 1/1970 | Lee |
| 3,768,760 A | 10/1973 | Jensen |

(Continued)

FOREIGN PATENT DOCUMENTS

| | | |
|---|---|---|
| DE | 202004007601 | 11/2004 |
| EP | 0433686 | 6/1991 |

(Continued)

OTHER PUBLICATIONS

International Search Report and Written Opinion dated Feb. 19, 2014 in PCT/US2013/072662.

(Continued)

*Primary Examiner* — Camie S Thompson
(74) *Attorney, Agent, or Firm* — Miller, Matthias & Hull LLP

(57) ABSTRACT

A composite laminate, method of forming same, and use for same are disclosed. One example of a composite laminate has multiple layers or plies (305A-305E) composed of generally parallel reinforcing fibers (315A-315E) embedded in a matrix (305M). The reinforcing fibers have orientations in the ranges of 3 to 8 degrees, −3 to −8 degrees, 10 to 40 degrees, −10 to −40 degrees, and approximately 90 degrees, the orientations being with respect to a predetermined axis (320), such as an axis of tension (T). A method of manufacturing a composite laminate includes laying a resin and fibers having these orientations and then curing the resulting laminate. One example of a use is for the skin on the fuselage or wing of an aircraft.

23 Claims, 4 Drawing Sheets

(56) References Cited

U.S. PATENT DOCUMENTS

| | | | |
|---|---|---|---|
| 3,975,916 A | 8/1976 | Watson |
| 3,976,269 A | 8/1976 | Gupta |
| 3,983,900 A | 10/1976 | Airhart |
| 4,084,029 A | 4/1978 | Johnson et al. |
| 4,098,559 A | 7/1978 | Price |
| 4,177,306 A | 12/1979 | Schulz et al. |
| 4,198,018 A | 4/1980 | Brault |
| 4,207,778 A | 6/1980 | Hatch |
| 4,232,844 A | 11/1980 | Sobey |
| 4,310,132 A | 1/1982 | Robinson et al. |
| 4,368,234 A | 1/1983 | Palmer et al. |
| 4,379,798 A | 4/1983 | Palmer et al. |
| 4,413,110 A | 11/1983 | Kavesh et al. |
| 4,425,980 A | 1/1984 | Miles |
| 4,627,791 A | 12/1986 | Marshall |
| 4,712,533 A | 12/1987 | Cruise |
| 4,734,146 A | 3/1988 | Halcomb et al. |
| 4,741,943 A | 5/1988 | Hunt |
| 4,808,461 A | 2/1989 | Boyce et al. |
| 4,908,254 A | 3/1990 | Fischer et al. |
| 4,966,802 A | 10/1990 | Hertzberg |
| 5,064,439 A | 11/1991 | Chang et al. |
| 5,096,772 A | 3/1992 | Snyder |
| 5,154,370 A | 10/1992 | Cox et al. |
| 5,164,255 A | 11/1992 | Weeks |
| 5,242,523 A | 9/1993 | Wilden et al. |
| 5,251,848 A | 10/1993 | Gannatal |
| 5,269,657 A | 12/1993 | Garfinkle |
| 5,306,557 A | 4/1994 | Madison |
| 5,333,568 A | 8/1994 | Meldner et al. |
| 5,342,465 A | 8/1994 | Bronowicki et al. |
| 5,362,345 A | 11/1994 | Stettler et al. |
| 5,429,066 A | 7/1995 | Lewit et al. |
| 5,429,326 A | 7/1995 | Garesche et al. |
| 5,476,704 A | 12/1995 | Kohler |
| 5,518,208 A | 5/1996 | Roseburg |
| 5,538,781 A | 7/1996 | Rao et al. |
| 5,632,940 A | 5/1997 | Whatley |
| 5,669,999 A | 9/1997 | Anderegg et al. |
| 5,733,390 A | 3/1998 | Kingston |
| 5,735,486 A | 4/1998 | Piening et al. |
| 5,766,724 A | 6/1998 | Tailor et al. |
| 5,833,786 A | 11/1998 | McCarville et al. |
| 5,866,272 A | 2/1999 | Westre et al. |
| 5,922,446 A | 7/1999 | Piening et al. |
| 5,958,550 A | 9/1999 | Childress |
| 5,972,524 A | 10/1999 | Childress |
| 6,024,325 A | 2/2000 | Carter, Jr. |
| 6,037,060 A | 3/2000 | Blohowlak et al. |
| 6,114,050 A | 9/2000 | Westre et al. |
| H1872 H | 10/2000 | Bowman |
| 6,277,463 B1 | 8/2001 | Hamilton et al. |
| 6,306,239 B1 | 10/2001 | Breuer et al. |
| 6,320,118 B1 | 11/2001 | Pridham et al. |
| 6,355,337 B1 | 3/2002 | Piening et al. |
| 6,355,584 B1 | 3/2002 | Corrons |
| 6,372,072 B1 | 4/2002 | Healey |
| 6,405,978 B1 | 6/2002 | Dean et al. |
| 6,436,507 B1 | 8/2002 | Pannell |
| 6,502,788 B2 | 1/2003 | Noda et al. |
| 6,511,570 B2 | 1/2003 | Matsui |
| 6,554,225 B1 | 4/2003 | Anast et al. |
| 6,565,944 B1 | 5/2003 | Hartness et al. |
| 6,641,693 B2 | 11/2003 | Guckert et al. |
| 6,641,893 B1 | 11/2003 | Suresh et al. |
| 6,655,633 B1 | 12/2003 | Chapman, Jr. |
| 6,703,118 B2 | 3/2004 | van Weperen et al. |
| 6,729,792 B2 | 5/2004 | Pritzer |
| 6,779,830 B2 | 8/2004 | Patberg et al. |
| 6,835,341 B2 | 12/2004 | Node et al. |
| 6,886,780 B1 | 5/2005 | Castaner |
| 6,914,021 B2 | 7/2005 | Sidwell |
| 7,080,805 B2 | 7/2006 | Prichard et al. |
| 7,115,323 B2 | 10/2006 | Westre et al. |
| 7,159,822 B2 | 1/2007 | Grantham et al. |
| 7,807,249 B2 | 10/2010 | Kismarton |
| 8,201,371 B2 | 9/2012 | Kismarton |
| 2002/0015819 A1 | 2/2002 | Edwards et al. |
| 2003/0148082 A1 | 8/2003 | Bompard et al. |
| 2003/0168555 A1 | 9/2003 | Livi et al. |
| 2003/0189131 A1 | 10/2003 | Cloud et al. |
| 2004/0024502 A1 | 2/2004 | Squires et al. |
| 2004/0213952 A1 | 10/2004 | Takemura et al. |
| 2004/0265536 A1 | 12/2004 | Sana et al. |
| 2005/0153098 A1 | 7/2005 | Bhatnagar et al. |
| 2005/0250440 A1 | 11/2005 | Zhou et al. |
| 2005/0263645 A1 | 12/2005 | Johnson et al. |
| 2006/0222837 A1* | 10/2006 | Kismarton ............ B29C 70/083 428/297.4 |
| 2006/0226287 A1 | 10/2006 | Grantham et al. |
| 2006/0237588 A1 | 10/2006 | Kismarton |
| 2006/0243860 A1 | 11/2006 | Kismarton |
| 2006/0272143 A1* | 12/2006 | Kismarton ............ B29C 70/202 29/458 |
| 2010/0219294 A1 | 9/2010 | Kismarton |
| 2011/0045232 A1 | 2/2011 | Kismarton |

FOREIGN PATENT DOCUMENTS

| | | |
|---|---|---|
| EP | 1174533 | 1/2002 |
| EP | 1336469 | 8/2003 |
| EP | 1762666 | 3/2007 |
| FR | 2660892 | 10/1991 |
| GB | 2238977 | 6/1991 |
| JP | H091713 A | 1/1997 |
| JP | 2003066968 | 3/2003 |
| JP | 2013532075 A | 8/2013 |
| JP | 2013231402 A | 11/2013 |
| WO | WO9640551 | 12/1996 |
| WO | WO0216197 | 2/2002 |
| WO | WO0216784 | 2/2002 |
| WO | 2011142920 A1 | 11/2011 |

OTHER PUBLICATIONS

U.S. Office Action dated Jul. 27, 2006 in U.S. Appl. No. 11/096,727.
U.S. Office Action dated Nov. 16, 2006 in U.S. Appl. No. 11/096,727.
U.S. Office Action dated Mar. 21, 2007 in U.S. Appl. No. 11/096,727.
U.S. Office Action dated Jul. 30, 2007 in U.S. Appl. No. 11/096,727.
U.S. Office Action dated Nov. 12, 2008 in U.S. Appl. No. 11/096,727.
U.S. Office Action dated Aug. 2, 2007 in U.S. Appl. No. 11/118,594.
U.S. Office Action dated Jan. 23, 2008 in U.S. Appl. No. 11/118,594.
U.S. Office Action dated Aug. 14, 2008 in U.S. Appl. No. 11/118,594.
U.S. Office Action dated Mar. 17, 2009 in U.S. Appl. No. 11/118,594.
U.S. Office Action dated Sep. 28, 2009 in U.S. Appl. No. 11/118,594.
International Written Opinion dated Oct. 20, 2006 in PCT Application No. PCT/US06/10703.
International Written Opinion dated Oct. 10, 2006 in PCT Application No. PCT/US06/09730.
Garfinkle et al., "Aerospace: Smart Spars, Intrinsically-Smart Composite Structures," Fiber Architects, High Performance Textile Consultants, http://fiberarchitects.com/aerospace/spar.html, pp. 1-8, Jan. 1999.
Gay, "Materiaux Composites," Hermes, Paris, 1997, pp. 107-109.
Chinese Office Action from CN Application No. 2013800631962 dated Nov. 30, 2016, 12 pages.
Chinese Office Action for Related Patent Application No. 2013800631962; Report dated Mar. 31, 2017.
Rast, Joshua, "Characterizing the Fatigue Damage in Non-Traditional Laminates of Carbon Fiber Composites Using Radiography," May 2009.
Tompson, Carl G., "Radiographic Determination of the Lay-Up Influence on Fatigue Damage Development Under Bearing/Bypass Conditions," May 2009.

(56) References Cited

OTHER PUBLICATIONS

Treasurer, Paul J., "Characterization and Analysis of Damage Progression in Non Traditional Composite Laminates With Circular Holes," Dec. 2006.
Johnson, W.S., et al., "Ply Modifications to Alter Damage Initiation and Progression in Laminates Containing Circular Holes," 16th International Conference on Composite Materials, 2007.
Canadian Office Action for Related Patent Application No. 2,883,747; Report dated Apr. 24, 2017.
Japanese Office Action for Related Patent Application No. 2015-545501; Report dated Nov. 6, 2017.

* cited by examiner

SPLIT RESISTANT COMPOSITE LAMINATE

BACKGROUND

Fiber-reinforced laminate composites are used in a variety of applications because they generally exhibit one or more desired characteristics, such as a light weight, increased durability, and a high strength-to-weight ratio. One problem that may occur in a composite article is uncontrolled splitting along the orientation of the fibers, especially if an object strikes the composite article with sufficient mass and/or energy to create a large notch or hole which substantially or completely penetrates the composite. Although such damage may be a minor or even a major irritant in some cases, such damage may have catastrophic consequences if the composite article is, for example, the wing skin of an aircraft.

SUMMARY

This Summary is provided to introduce a selection of concepts in a simplified form that are further described below in the Detailed Description. This Summary is not intended to be used to limit the scope of the claimed subject matter. Concepts and technologies described herein provide for an improved composite laminate, a method for making same, and at least one example of using same.

A composite laminate has numerous reinforcing fibers embedded in a matrix. In one application, a first plurality of the reinforcing fibers are generally parallel with an orientation in the range of 3 to 8 degrees, a second plurality of the reinforcing fibers are generally parallel with an orientation in the range of −3 to −8 degrees, a third plurality of the reinforcing fibers are generally parallel with an orientation in the range of 10 to 40 degrees, a fourth plurality of the reinforcing fibers are generally parallel with an orientation in the range of −10 to −40 degrees, and a fifth plurality of the reinforcing fibers are generally parallel with an orientation of approximately 90 degrees.

A method of manufacturing a composite laminate embeds reinforcing fibers in a matrix, a first plurality of the reinforcing fibers generally being parallel with an orientation in the range of 3 to 8 degrees, a second plurality of the reinforcing fibers generally being parallel with an orientation in the range of −3 to −8 degrees, a third plurality of the reinforcing fibers generally being parallel with an orientation in the range of 10 to 40 degrees, a fourth plurality of the reinforcing fibers generally being parallel with an orientation in the range of −10 to −40 degrees, and a fifth plurality of the reinforcing fibers generally being parallel with an orientation of approximately 90 degrees, the orientations being with respect to a predetermined axis.

An aircraft has a fuselage, a wing assembly operatively connected to the fuselage, and a composite laminate incorporated into at least a selected portion of the fuselage or the wing assembly. The composite laminate has reinforcing fibers embedded in a matrix, a first plurality of the reinforcing fibers generally being parallel with an orientation in the range of 3 to 8 degrees, a second plurality of the reinforcing fibers generally being parallel with an orientation in the range of −3 to −8 degrees, a third plurality of the reinforcing fibers generally being parallel with an orientation in the range of 10 to 40 degrees, a fourth plurality of the reinforcing fibers generally being parallel with an orientation in the range of −10 to −40 degrees, and a fifth plurality of the reinforcing fibers generally being parallel with an orientation of approximately 90 degrees, the orientations being with respect to a predetermined axis.

The matrix may be, for example but not limited to, an epoxy resin, a polymer, a metal, or a ceramic. In one configuration the fibers are positioned to have approximately the following general orientations: 5 degrees, −5 degrees, 30 degrees, −30 degrees, and 90 degrees. In another configuration the fibers are positioned to have approximately the following general orientations: 5 degrees, −5 degrees, 20 degrees, −20 degrees, and 90 degrees.

The features, functions, and advantages that have been discussed can be achieved independently in various configurations of the present disclosure or may be combined in other configurations, further details of which can be seen with reference to the following description and drawings.

DETAILED DESCRIPTION

Figure 1:
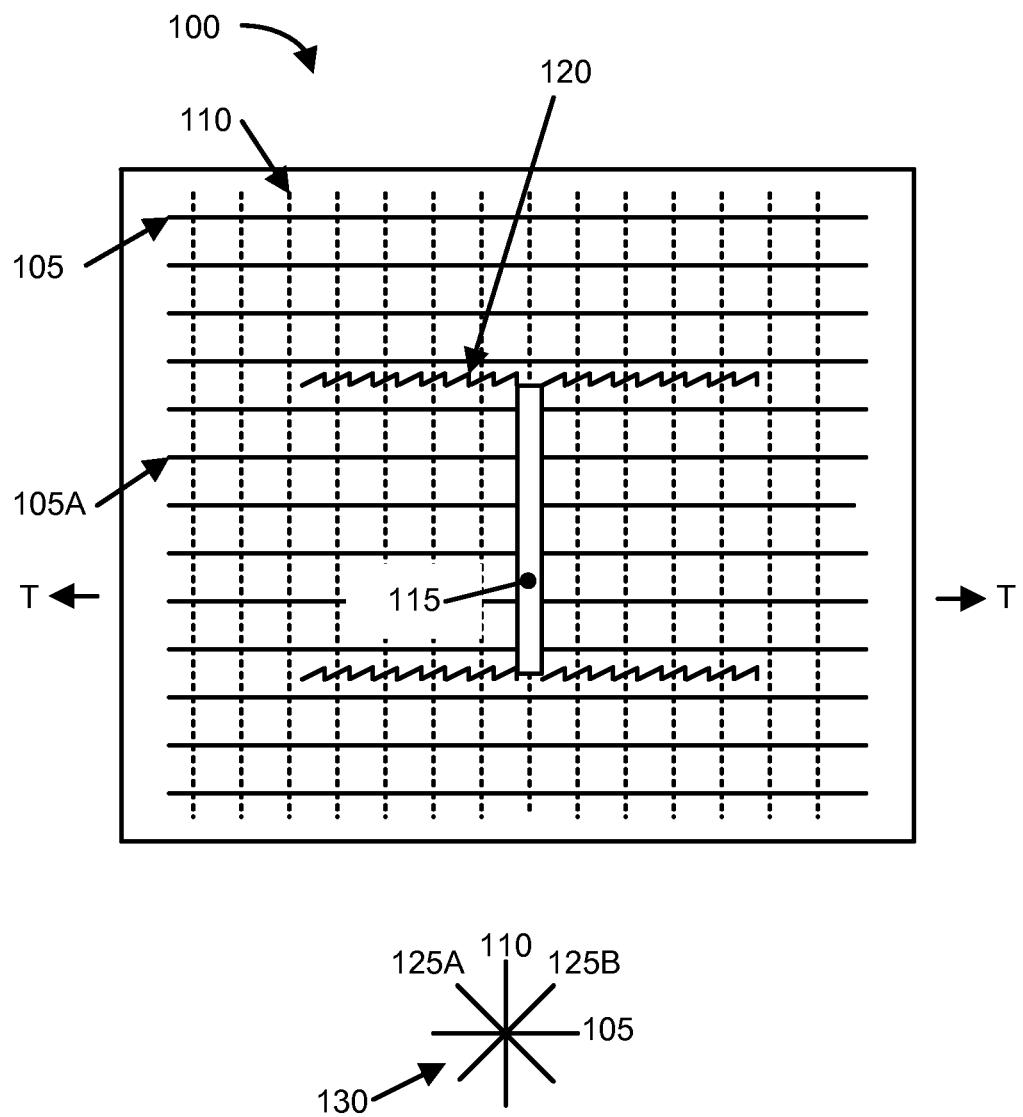
FIG. 1 is an illustration of exemplary large notch damage in an exemplary composite panel.

The following detailed description is directed to a composite laminate, methods for making same, and uses for same. In the following detailed description, references are made to the accompanying drawings that form a part hereof, and which are shown by way of illustration, specific configurations, or examples. Like numerals represent like elements through the several figures.

A composite laminate, also known as a carbon-fiber-reinforced polymer, comprises carbon reinforcing fibers embedded in a matrix such as an epoxy resin, a polymer, a metal, or a ceramic. A polymer resin, often simply referred to as a "resin", includes, but is not limited to, epoxy, polymer, polyester, vinyl ester, or nylon. These composite laminates provide a high strength-to-weight ratio and are often used, by way of example and not of limitation, in aerospace applications, automobiles, sailboats, sporting goods, bicycles, motorcycles, housings for electronics, and other military, industrial, and consumer applications. The fibers provide strength in a longitudinal direction, but not in a cross-fiber direction, so the laminates typically comprise layers of fibers in different directions, typically 0 degrees, ±45 degrees, and 90 degrees with respect to an axis of tension. Such composite laminates may be formed, for example, from multiple layers or plies which are bonded together, each layer being a plurality of fibers embedded in a matrix.

In an ideal environment for a composite laminate, major impacts with other objects would either be minimal or non-existent. In an actual environment, however, such as for an aircraft, significant impacts with other objects can be expected from such differing sources as weather-related meteors such as hailstones, failure of another component such as an engine, or even enemy projectiles or shrapnel therefrom. Some objects, rather than causing minor damage to a single ply, frequently cause damage to many of the plies, and may even penetrate all of the plies. For convenience of discussion, and not as a limitation, this type of damage may be referred to herein as "large notch" damage. Some traditional composite laminates exhibit a propensity to propagate large notch damage by longitudinal splitting of the laminate in a direction roughly parallel to the direction of the tension. Thus, when such large notch damage occurs, normally-present tension across the area of damage may result in complete and/or functional failure of the laminate, possibly with catastrophic results, such as the loss of the aircraft if such failure occurs in, for example, certain parts of a wing or a fuselage. For example, if the split in a skin of an aircraft wing propagates toward a stringer in an aircraft wing then the splitting may be arrested by the stringer. If, however, the split propagates parallel to the stringer then there may be nothing to arrest the splitting and the wing may fail.

U.S. Pat. No. 7,807,249 entitled "Composite Article Having Reinforcing Fibers Oriented To Suppress Or Delay Ply Splitting", U.S. Patent Publication US2006/0222837A1 entitled "Multi-Axial Laminate Composite Structures And Methods Forming The Same", U.S. Patent Publication US2006/0243860A1 entitled "Composite Skin And Stringer Structure And Method For Forming The Same", and U.S. Patent Publication US2011/0045232A1 entitled "Composite Stiffeners For Aerospace Vehicles", are by Max U. Kismarton, are assigned to The Boeing Company, Chicago, Ill., and are hereby incorporated herein by reference as entirely as if copied in full herein. These documents disclose various methods of making and using composite laminates.

FIG. 1 is an illustration of exemplary large notch damage 115 in an exemplary composite panel 100. The panel 100 comprises multiple plies. By convention, plies having fibers primarily oriented along the axis of tension T are referred to as "alpha" plies and "alpha" fibers, plies having fibers primarily oriented at another angle with respect to that axis are referred to as "beta" plies and "beta" fibers, and plies having fibers primarily oriented at yet another angle with respect to that axis are referred to as "gamma" plies and "gamma" fibers. In one typical composite, the alpha plies have a fiber orientation angle of 0 degrees, the beta plies have fiber orientations of ±45 degrees, and the gamma ply has a fiber orientation of 90 degrees, and at least 10 percent of the plies are oriented in each of these four directions. It is also possible to place fibers having different orientations in a single ply. For example, the alpha fibers and/or the beta fibers and/or the gamma fibers could be embedded in a single ply. Also for example, fibers having different orientations could be spun into a fiber cloth. Of course, many applications require multiple plies of each orientation to achieve the desired strength or other characteristic. Multiple layers may also be bonded together, such as by, but not limited to, a resin.

As shown in FIG. 1, an alpha layer (not shown or numbered separately) has parallel fibers 105 having an orientation which is parallel to the tensioning force T, a gamma layer (not shown or numbered separately) has parallel fibers 110 having an orientation which is perpendicular to the tensioning force T, and beta layers (not shown or numbered separately) having parallel fibers 125A, 125B having orientations of plus and minus 45 degrees. The beta fibers 125 are not shown in the panel 100 for convenience and clarity of illustration, but are indicated in the insert 130.

Now assume that there is an impact with an object which causes large notch damage 115. It will be seen that the parallel fibers 105A have been cut at the large notch damage point 115. If there is tension T across the panel 100, then the tension is along the uncut parallel fibers 105 so they stretch in response to the tension. The cut parallel fibers 105A, however, terminate at the large notch damage 115, so they are free on that end and therefore are not subject to the tension to the same degree. As a consequence, they do not stretch, or they stretch very little. As the uncut parallel fibers 105 stretch, but the cut parallel fibers 105A do not stretch, a shearing force develops between them and, if the tension T is sufficiently large, the differences in the lengths of the stretched fibers and the unstretched fibers cause the cut parallel fibers 105A to be sheared away from the neighboring uncut parallel fibers 105, as indicated by the exemplary cracks 120. The cracks 120 can propagate along the lines of tension and can eventually propagate through the entire length of a ply, or plies, in the panel 100. This severely degrades the strength of the panel 100. This splitting failure mode becomes progressively more likely as the percentage of fibers parallel with the tension T increases.

One contemporary solution to large notch longitudinal splitting is to add more 45 degree fibers. The 45 degree fibers act to direct the splitting toward a stringer in an aircraft wing where the splitting will be arrested. Adding more of these 45 degree plies, however, reduces the modulus and increases the weight. A higher modulus increases some measures of structural efficiency, such as but not limited to weight, unnotched tension, filled hole tension, edge notch tension, and filled hole compression. A lower modulus can sometimes have undesired results, such as but not limited to fluttering and problems with integrating the various components of an aircraft or other vehicle or structure. Therefore, reducing the modulus is undesirable, especially while also increasing the weight.

Figure 2:
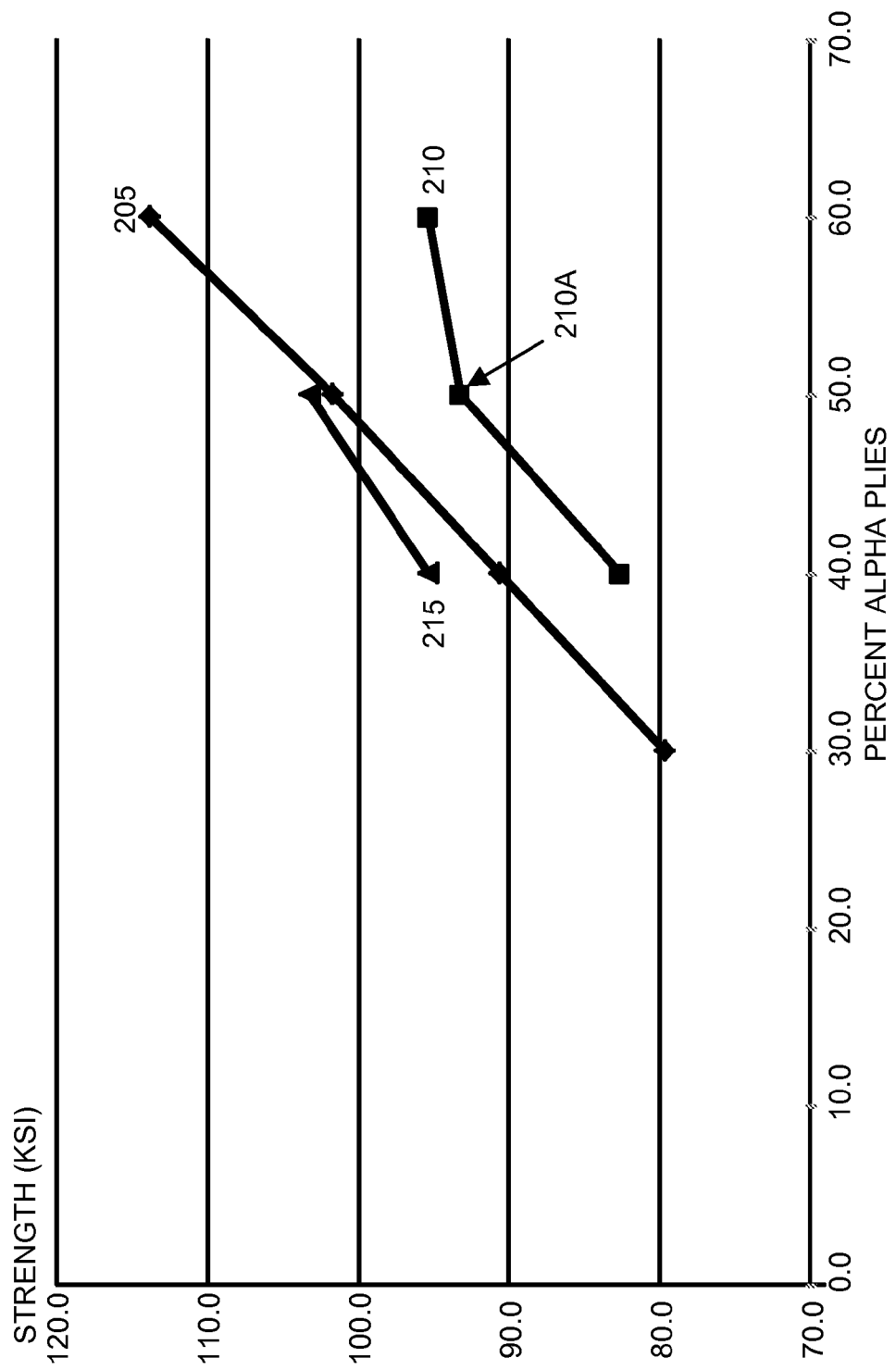
FIG. 2 illustrates the relationship between the tensile strength of some composite test panels and the percentage of alpha plies or fibers.

FIG. 2 illustrates the relationship between the tensile strength of some composite test panels and the percentage of alpha plies or fibers. It will be seen from line 205 that the filled hole tension strength of a traditional laminate (0 degrees, ±45 degrees, 90 degrees) rises linearly as the percentage of alpha plies increases. A substantial portion of this line 205 cannot be used, however, because many applications, such as but not limited to wing skins, are not only at risk for longitudinal splitting in the 0 degree direction, but also must maintain the ability to carry torsion and discrete chordwise loads e.g., engine thrust loads. An increase in the percentage of alpha plies means a corresponding decrease in the number of beta and gamma plies if the same laminate thickness and weight is to be obtained, and this can result in a reduction in the torsional and chordwise capability.

Another approach is to use a modified laminate, with plies of ±5 degrees, ±45 degrees, and 90 degrees, as discussed in at least one of the above documents. As seen from a portion of line 210, the resistance of the modified laminate to splitting also rises linearly as the percentage of alpha plies increases. Surprisingly, this approach does not give the expected results. First, it will be noted that the strength is lower, as compared to line 205, for the same percentage of alpha plies. In addition, note that the line 210 reaches a "knee" 210A and/or begins to flatten when the alpha ply percentage reaches around 50 percent. Thus, increasing the percentage of alpha plies can provide diminishing returns for strength in both the longitudinal direction and the spanwise direction.

It has been unexpectedly found, however, that the strength in the longitudinal direction increases substantially when the orientation of the beta plies is modified to be 10 to 40 degrees rather than 45 degrees. The strength shown by line 215 is surprisingly higher than the strength of either line 205 or line 210 for the same percentage of alpha plies. Thus, while the ±5 degree alpha plies resist longitudinal splitting in a tensioned panel that has large notch damage, these modified-beta plies also increase the longitudinal strength.

For example, when the laminate contains 40 percent alpha plies, the strength of the tested traditional laminate (205) was just over 90 Ksi, but the strength of the tested alpha-modified laminate (210) was lower, around 83 Ksi. In contrast, however, the strength of the alpha- and beta-modified laminate of 215 was just over 95 Ksi, higher than either of the other laminates. The traditional laminate (205) did not reach this strength until the alpha ply percentage was near 45 percent, and the alpha-modified laminate (210) did not reach this strength until the alpha ply percentage was near 60 percent. As noted above, the higher the percentage of alpha plies, the lower the percentage of beta and gamma plies available to resist torsional and chordwise loads. In the alpha- and beta-modified laminate of 215, however, a given percentage of alpha plies yields a higher longitudinal strength than for a traditional or an alpha-only modified laminate, and therefore allows a larger percentage of plies to be available for providing the desired spanwise strength.

Figure 3:
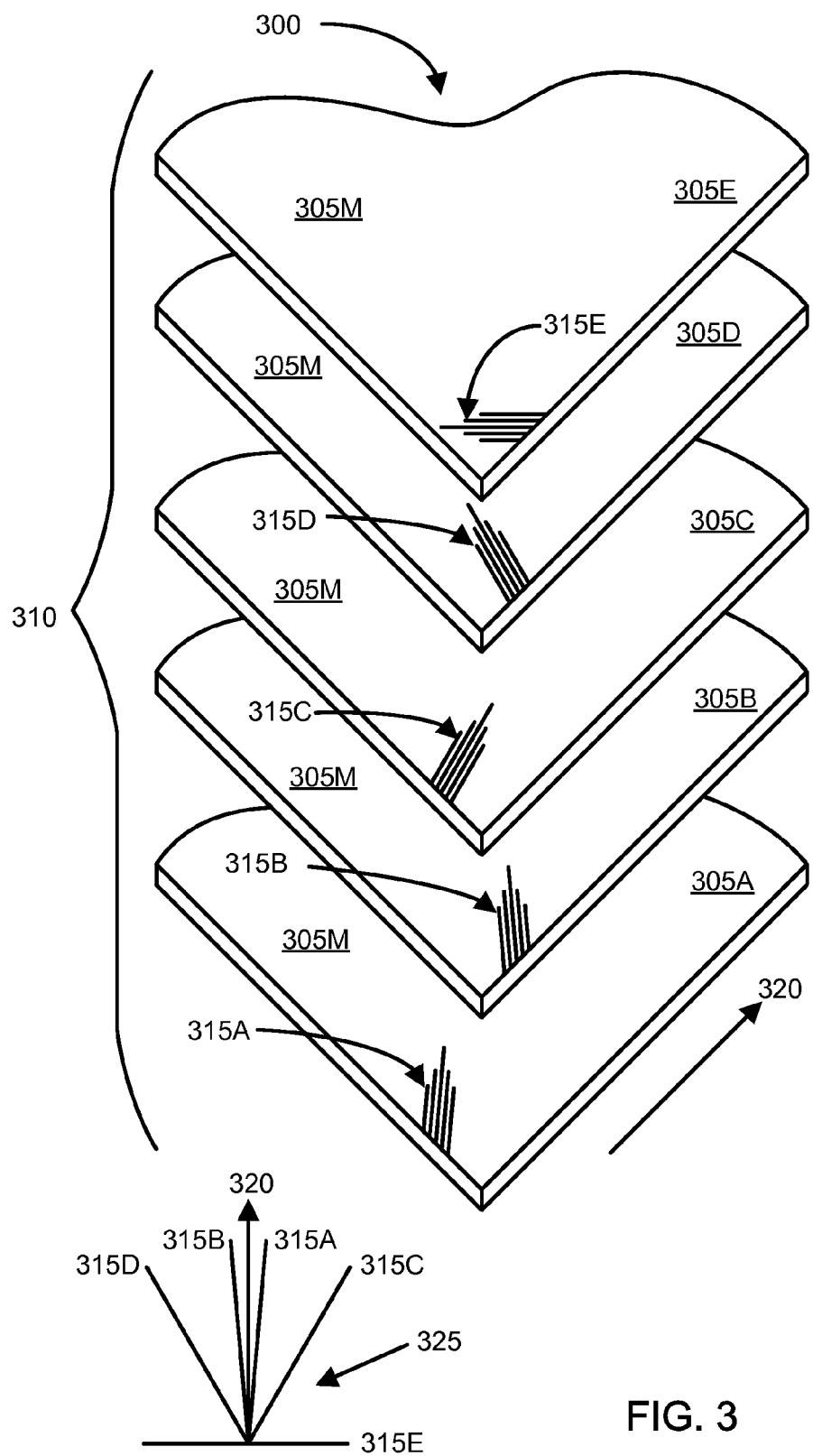
FIG. 3 is a partial exploded isometric view of one exemplary composite laminate modified as disclosed herein to improve resistance to longitudinal splitting from large notch damage.

FIG. 3 is a partial exploded isometric view of one exemplary composite laminate 300 modified as disclosed herein to improve resistance to longitudinal splitting in a large notch damage scenario while simultaneously increasing longitudinal strength for other key structural measures (e.g., filled hole tension, edge notch tension, and bearing-bypass). Laminate 300 has layers 305 (305A, 305B, 305C, 305D and 305E), which make up a set 310. A laminate 300 may comprise multiple sets 310 of layers 305. For example, a typical aircraft wing may have 60 to 90 layers 305. This number of layers is provided merely as an example and is not intended to be limiting in any manner; more layers, or fewer layers, may be used depending upon the characteristics desired for the composite laminate. Each layer 305A-305E is composed of reinforcement fibers 315A-315E, respectively, the fibers 315 in a layer 305 being generally parallel to each other and being imbedded in the matrix, the matrix being generally indicated as 305M. The fibers 315 in a layer 305 in a set 310 are preferably, but not necessarily, oriented in a different direction than the fibers 315 in the other layers 305 in the set 310. For example, the fibers 315C in layer 305C are oriented in a different direction than the fibers 315A, 315B, 315D, 315E in layers 305A, 305B, 305D, 305E, respectively. The orientation of the fibers 315, as discussed herein, are with respect to the axis of tension 320. The insert 325 provides a general view of the various fiber orientations with respect to the axis of tension 320. The alpha plies resist longitudinal splitting, the gamma plies stabilize the laminate, increase bearing performance, and increase transverse performance, and the modified beta plies increase longitudinal performance while reducing the percentage of alpha plies needed to maintain the required laminate strength.

In one configuration, the fibers 315A (alpha fibers) in ply 305A have an orientation of 3 to 8 degrees, the fibers 315B (also alpha fibers) in ply 305B have an orientation of −3 to −8 degrees, the fibers 315C (beta fibers) in ply 305C have an orientation of 10 to 40 degrees, the fibers 315D (also beta fibers) in ply 305D have an orientation of −10 to −40 degrees, and the fibers 315E (gamma fibers) in ply 305E have an orientation of approximately 90 degrees. In another configuration, the alpha values are ±5 degrees. In another configuration, the beta values are ±30 degrees. In another configuration, the beta values are ±20 degrees. In another configuration, the alpha plies have orientations of ±5 degrees, the beta plies have orientations of ±30 degrees, and the gamma plies have an orientation of 90 degrees. In another configuration, the alpha plies have orientations of ±5 degrees, the beta plies have orientations of ±20 degrees, and the gamma plies have an orientation of 90 degrees.

In one configuration, the alpha plies 305A and 305B collectively comprise 30 to 60 percent of the volume of the laminate 300. In another configuration, the beta plies 305C and 305D collectively comprise 30 to 60 percent of the volume of the laminate 300. In another configuration, the gamma plies 305E comprise 10 to 20 percent of the volume of the laminate 300. In another configuration, the beta plies 305C and 305D collectively comprise 40 percent of the volume of the laminate 300. In yet another configuration, the alpha plies 305A and 305B collectively comprise approximately 50 percent of the volume of the laminate 300, the beta plies 305C and 305D collectively comprise approximately 40 percent, and the gamma plies 305E comprise approximately 10 percent. The percentages listed herein represent the volume of the reinforcing fibers with a particular orientation as compared to the total volume of the reinforcing fibers in the laminate.

Methods of making a composite laminate are well known in the art and are not discussed in detail herein. Making a composite laminate with the particular orientations discussed herein to achieve the particular characteristics described herein is not known, however, in the art. Briefly stated, the resin and fibers having the orientations discussed herein are laid and the resulting laminate is then cured. If desired, several laminates may be made and then the laminates bonded together and cured. Preferably, the 90 degree plies are positioned away from the midplane of a laminate. Also, preferably, there should not be groups of plies having the same orientation but, preferably, plies of one orientation should be interspersed with plies of other orientations. For example, alpha plies should be interspersed with beta plies. Also, preferably, a laminate is symmetrical about its midplane. For example, if the third ply above the midplane is a −5 degree ply, then the third ply below the midplane would also be a −5 degree ply. Also, it will be appreciated that a layer may contain multiple plies of the same orientation or differing orientations.

Figure 4:
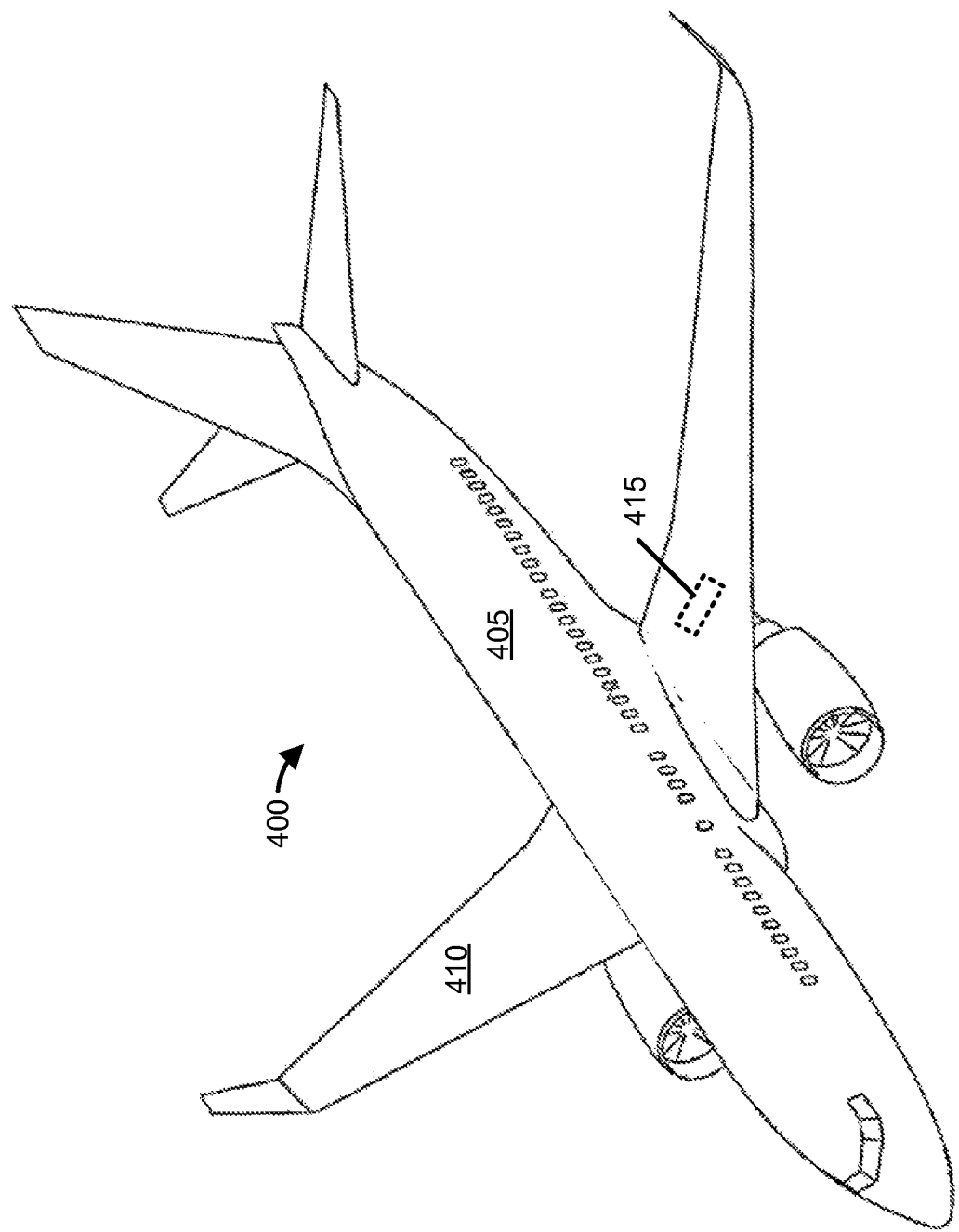
FIG. 4 is an illustration of an exemplary aircraft having a portion of its skin composed of a composite laminate.

FIG. 4 is an illustration of an exemplary aircraft having a portion of its skin composed of a composite laminate. The exemplary aircraft 400 has a fuselage 405 and at least one wing assembly 410. The composite laminate described herein may be used as a portion, or all, of the skin on the fuselage 405, the wing assembly 410, or both, as desired or appropriate for a particular aircraft 400 and its expected environment. For example, in an environment wherein any large notch damage will typically be on the wing assembly 410, then at least a portion of the skin of the wing assembly 410 will be composed of the composite laminate described herein. It should also be noted that the composite laminate described herein may also be used on only selected portions of the skin. For example, in an environment wherein any large notch longitudinal splitting will typically be in only a particular area 415 on the underside of the wing assembly 410, then at least that area will be composed of the composite laminate described herein.

Based on the foregoing, it should be appreciated that technologies for providing a split resistant composite laminate have been disclosed herein. It is to be understood that the appended claims are not necessarily limited to the specific features, configurations, acts, or media described herein. Rather, the specific features, configurations, acts and mediums are disclosed as example forms of implementing the claims.

The subject matter described above is provided by way of illustration only and should not be construed as limiting.

Various modifications and changes may be made to the subject matter described herein without following the example configurations and applications illustrated and described, and without departing from the true spirit and scope of the present disclosure, which is set forth in the following claims.

What is claimed is:

1. A wing skin, comprising:
a composite laminate comprising
a matrix; and
reinforcing fibers embedded in the matrix, a first plurality of the reinforcing fibers generally being parallel with an orientation in a range of 3 to 8 degrees, a second plurality of the reinforcing fibers generally being parallel with an orientation in a range of −3 to −8 degrees, a third plurality of the reinforcing fibers generally being parallel with an orientation in a range of 21 to 40 degrees, a fourth plurality of the reinforcing fibers generally being parallel with an orientation in a range of −21 to −40 degrees, and a fifth plurality of the reinforcing fibers generally being parallel with an orientation of approximately 90 degrees, the orientations being with respect to a predetermined axis, the reinforcing fibers of the composite laminate collectively having a total volume, the first and the second pluralities of the reinforcing fibers making up about 50 percent of the total volume, and the third and the fourth pluralities of the reinforcing fibers making up about 40 percent of the total volume.

2. The wing skin of claim 1 wherein the reinforcing fibers of the first plurality have an orientation of approximately 5 degrees and the reinforcing fibers of the second plurality have an orientation of approximately −5 degrees.

3. The wing skin of claim 1 wherein the reinforcing fibers of the third plurality have an orientation of approximately 30 degrees and the reinforcing fibers of the fourth plurality have an orientation of approximately −30 degrees.

4. The wing skin of claim 1 wherein the reinforcing fibers of the third plurality have an orientation of approximately 40 degrees and the reinforcing fibers of the fourth plurality have an orientation of approximately −40 degrees.

5. The wing skin of claim 1 wherein the third plurality of the reinforcing fibers have an orientation in a range of 21 to 29 degrees, and wherein the fourth plurality of the reinforcing fibers have an orientation in a range of −21 to −29 degrees.

6. The wing skin of claim 1 wherein the third plurality of the reinforcing fibers have an orientation in a range of 31 to 40 degrees, and wherein the fourth plurality of the reinforcing fibers have an orientation in a range of −31 to −40 degrees.

7. The wing skin of claim 1 wherein the composite laminate is a portion of a skin of an aircraft.

8. The wing skin of claim 1 wherein the predetermined axis is an axis of tension on the composite laminate.

9. The wing skin of claim 1 wherein two of the pluralities, both having reinforcing fibers having an identical orientation, are separated by at least one plurality which has reinforcing fibers having a different orientation.

10. The wing skin of claim 1 wherein the composite laminate has a midplane, and the pluralities are arranged symmetrically about the midplane.

11. A method of manufacturing a composite laminate of a wing skin, comprising:
embedding reinforcing fibers in a matrix, a first plurality of the reinforcing fibers generally being parallel with an orientation in a range of 3 to 8 degrees, a second plurality of the reinforcing fibers generally being parallel with an orientation in a range of −3 to −8 degrees, a third plurality of the reinforcing fibers generally being parallel with an orientation in a range of 31 to 40 degrees, a fourth plurality of the reinforcing fibers generally being parallel with an orientation in a range of −31 to −40 degrees, and a fifth plurality of the reinforcing fibers generally being parallel with an orientation of approximately 90 degrees, the orientations being with respect to a predetermined axis, wherein the reinforcing fibers collectively have a total volume, the first and the second pluralities of the reinforcing fibers making up about 50 percent of the total volume, and the third and the fourth pluralities of the reinforcing fibers making up about 40 percent of the total volume.

12. The method of claim 11 wherein embedding the reinforcing fibers comprises positioning the reinforcing fibers of the first plurality to have an orientation of approximately 5 degrees, and positioning the reinforcing fibers of the second plurality to have an orientation of approximately −5 degrees.

13. The method of claim 11 wherein embedding the reinforcing fibers comprises positioning the reinforcing fibers of the third plurality to have an orientation of approximately 31 degrees, and positioning the reinforcing fibers of the fourth plurality to have an orientation of approximately −31 degrees.

14. The method of claim 11 wherein embedding the reinforcing fibers comprises positioning the reinforcing fibers of the third plurality to have an orientation of approximately 40 degrees, and positioning the reinforcing fibers of the fourth plurality to have orientations of approximately −40 degrees.

15. The method of claim 11 wherein the predetermined axis is an axis of tension.

16. The method of claim 11 wherein two of the pluralities of reinforcing fibers, both having reinforcing fibers having an identical orientation, are separated by at least one plurality of reinforcing fibers which has reinforcing fibers having a different orientation.

17. The method of claim 11 wherein the composite laminate has a midplane, and the pluralities of reinforcing fibers are arranged symmetrically about the midplane.

18. An aircraft, comprising:
a fuselage;
a wing assembly operatively connected to the fuselage; and
a composite laminate incorporated into at least a selected portion of a skin of the fuselage or the wing assembly, the composite laminate comprising reinforcing fibers embedded in a matrix, a first plurality of the reinforcing fibers generally being parallel with an orientation in a range of 3 to 8 degrees, a second plurality of the reinforcing fibers generally being parallel with an orientation in a range of −3 to −8 degrees, a third plurality of the reinforcing fibers generally being parallel with an orientation in a range of 21 to 40 degrees, a fourth plurality of the reinforcing fibers generally being parallel with an orientation in a range of −21 to −40 degrees, and a fifth plurality of the reinforcing fibers generally being parallel with an orientation of approximately 90 degrees, the orientations being with respect to a predetermined axis such that none of the orientations are parallel with the predetermined axis, the reinforcing fibers collectively having a total volume, the first and the second pluralities of the reinforcing fibers making up about 50 percent of the total volume, and the third and the fourth pluralities of the reinforcing fibers making up about 40 percent of the total volume,
wherein the first, second, third, fourth, and fifth pluralities of the reinforcing fibers abut one another to comprise a first set of layers, and wherein the composite laminate comprises a plurality of sets of layers abutting one another, each set of layers equivalent to the first set of layers.

19. The aircraft of claim 18 wherein the reinforcing fibers of the first plurality have an orientation of approximately 5 degrees and the reinforcing fibers of the second plurality have an orientation of approximately −5 degrees.

20. The aircraft of claim 18 wherein the reinforcing fibers of the third plurality have an orientation of approximately 30 degrees and the reinforcing fibers of the fourth plurality have an orientation of approximately −30 degrees.

21. The aircraft of claim 18 wherein the reinforcing fibers of the third plurality have an orientation of approximately 40 degrees and the reinforcing fibers of the fourth plurality have an orientation of approximately −40 degrees.

22. The aircraft of claim 18 wherein the third plurality of the reinforcing fibers have an orientation in a range of 21 to 29 degrees, and wherein the fourth plurality of the reinforcing fibers have an orientation in a range of −21 to −29 degrees.

23. The aircraft of claim 18 wherein the third plurality of the reinforcing fibers have an orientation in a range of 31 to 40 degrees, and wherein the fourth plurality of the reinforcing fibers have an orientation in a range of −31 to −40 degrees.

* * * * *